United States Patent [19]

Kenny et al.

[11] Patent Number: 4,718,559

[45] Date of Patent: * Jan. 12, 1988

[54] PROCESS FOR RECOVERY OF NON-FERROUS METALLIC CONCENTRATE FROM SOLID WASTE

[75] Inventors: Garry R. Kenny, College Grove; Edward J. Sommer, Jr.; Mark E. Shepard, both of Nashville, all of Tenn.

[73] Assignee: Magnetic Separation Systems, Inc., Nashville, Tenn.

[*] Notice: The portion of the term of this patent subsequent to Sep. 17, 1902 has been disclaimed.

[21] Appl. No.: 751,318

[22] Filed: Jul. 2, 1985

Related U.S. Application Data

[63] Continuation-in-part of Ser. No. 397,559, Jul. 12, 1982, Pat. No. 4,541,530.

[51] Int. Cl.$^4$ .............................................. B07C 5/344
[52] U.S. Cl. .................................... 209/571; 324/233
[58] Field of Search ............... 209/3.1, 552, 555–557, 209/571, 636, 639, 930, 559, 563; 331/DIG. 2; 324/233, 236; 194/213

[56] References Cited

U.S. PATENT DOCUMENTS

| | | | |
|---|---|---|---|
| 3,216,567 | 11/1965 | Kelly | 209/571 |
| 3,650,396 | 3/1972 | Gillespie et al. | 209/3.1 |
| 3,701,419 | 10/1972 | Hutter et al. | 209/567 |
| 4,048,566 | 9/1977 | Carson et al. | 331/DIG. 2 |
| 4,069,145 | 1/1978 | Sommer, Jr. et al. | 209/636 |
| 4,263,551 | 4/1981 | Gregory et al. | 324/233 |
| 4,345,679 | 8/1982 | DeWoolfson | 194/213 |
| 4,368,429 | 1/1983 | Jamison | 324/233 |
| 4,541,530 | 9/1985 | Kenny et al. | 209/930 |

FOREIGN PATENT DOCUMENTS

| | | | |
|---|---|---|---|
| 0045869 | 4/1979 | Japan | 209/571 |
| 197709 | 4/1975 | U.S.S.R. | 324/233 |
| 639684 | 12/1978 | U.S.S.R. | 209/552 |

Primary Examiner—Robert B. Reeves
Assistant Examiner—Donald T. Hajec
Attorney, Agent, or Firm—Harrington A. Lackey

[57] ABSTRACT

Selective non-magentic detection of non-ferrous metallic particles in a mixture of same with ferrous metallic particles and non-metallic particles derived from homogenized and magnetically treated municipal or like waste by a plurality of electronic detectors and separation of a non-ferrous metallic concentrate from said mixture.

7 Claims, 3 Drawing Figures

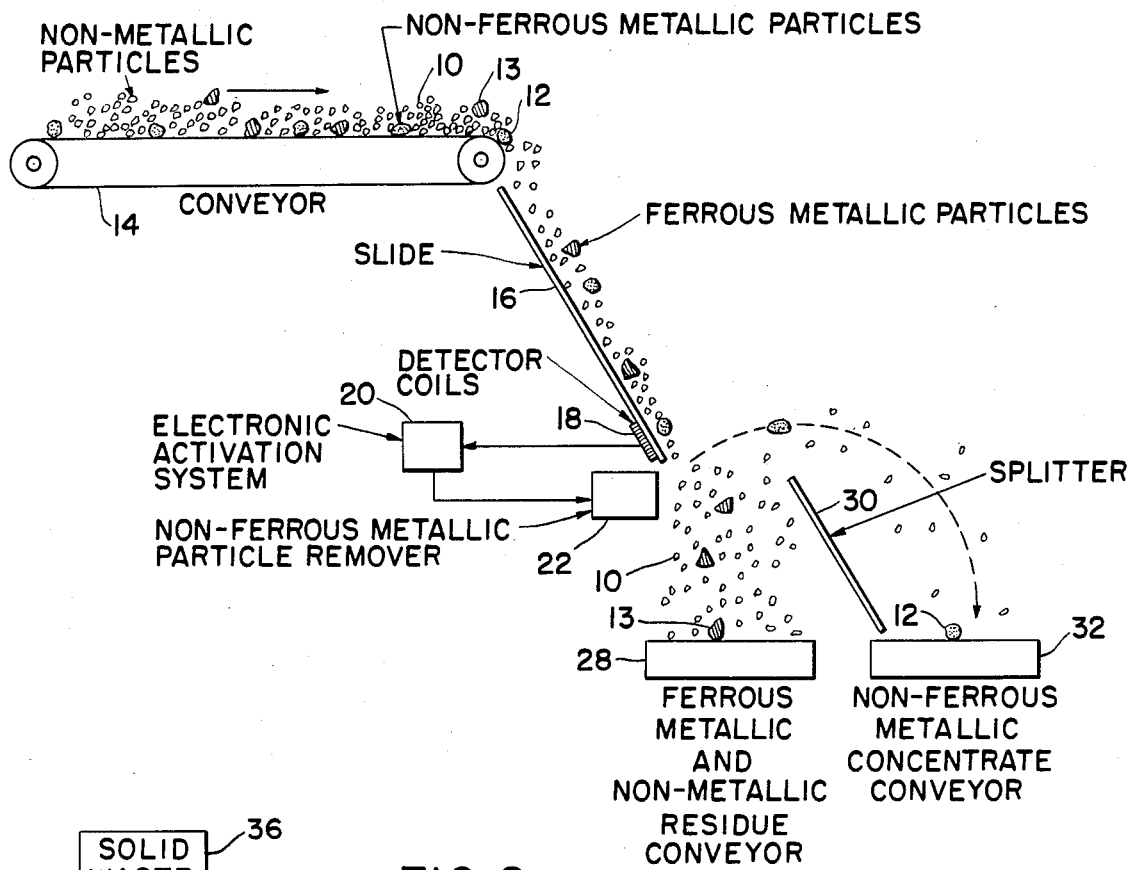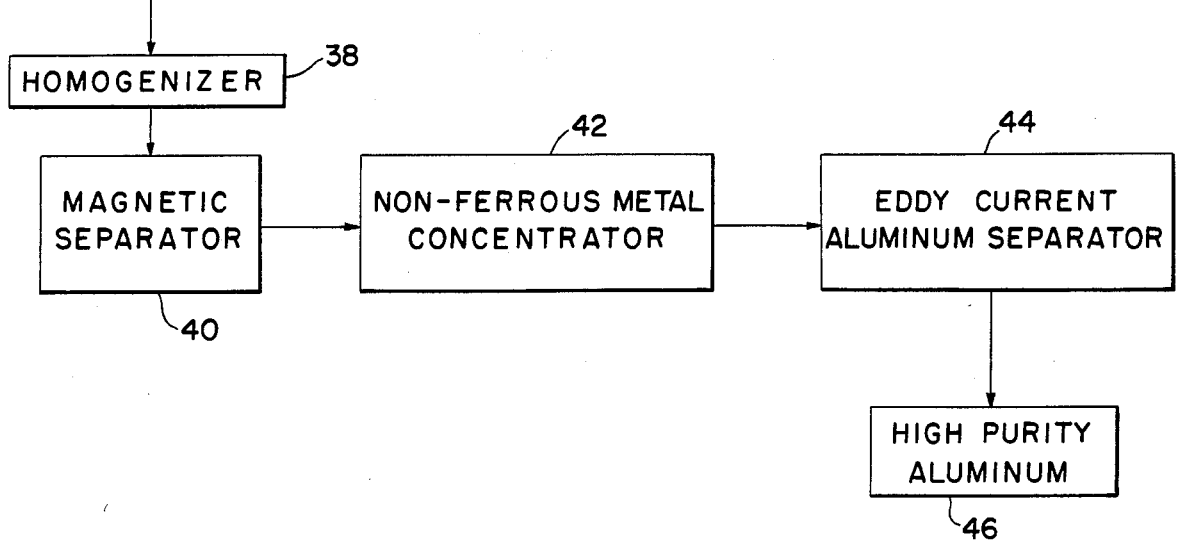

PROCESS FOR RECOVERY OF NON-FERROUS METALLIC CONCENTRATE FROM SOLID WASTE

BACKGROUND OF THE INVENTION

This is a continuation-in-part of Ser. No. 397,559, now U.S. Pat. No. 4,541,530, filed July 12, 1982.

1. FIELD OF THE INVENTION

This invention relates to treatment of solid waste such as garbage. More particularly, it relates to concentration of a metallic fraction of the waste, preferably followed by recovery in high purity form, for example, as high purity aluminum.

2. DESCRIPTION OF THE PRIOR ART

Heretofore solid waste material treatment systems have, in general, involved a series of metal and glass separation steps after shredding and air classification or the like. There has been no simple method for recovery of a metal concentrate from this waste, especially one suitable for obtaining highpurity aluminum therefrom.

SUMMARY OF THE INVENTION

After extended investigation we have found a method for preparing from homogenized and preferably magnetically treated municipal or like solid waste containing ferrous and non-ferrous metals and non-metallics a non-ferrous metal concentrate suitable for obtaining an aluminum concentrate therefrom, for example, by eddy current treatment according to our U.S. Pat. No. 4,069,145. According to our invention we do this without having to use magnets and without having to employ the many preliminary processing steps such as slurry or fluid bed treatment, photoelectric separation and the like required by prior art processes, for example, the process of Gillespie et al U.S. Pat. No. 3,650,396. Also, according to our invention, instead of employing magnets we use a plurality of adjacent detectors which detect the non-ferrous metallic and ignore the ferrous metallic particles and electronic means to trigger their separation and collection.

Thus, by employing an electronic detection and activation system in which ferrous conductors are ignored, we separate nonferrous metallic particles from non-metallic particles. We prefer to employ a pneumatic system to collect the non-ferrous particles. However, a mechanical system such as a solenoid or trapdoor arrangement may be used to obtain our metallic concentrate and leave a non-metallic residue. High-purity aluminum may then be isolated by a separation process such as that of our U.S. Pat. No. 4,069,145 already referred to.

BRIEF DESCRIPTION OF THE DRAWING

For a better understanding of our invention reference will now be made to the drawing, which represents a preferred embodiment of our invention as described in detail hereinbelow.

In the drawing,

FIG. 1 is a schematic depiction in semi-flowsheet form of the metal concentration process of the invention.

FIG. 2 is a flowsheet showing a representative metal concentration process according to the invention in which the metal concentration portion is a non-ferrous metal concentration step of a multi-step separation-concentration process.

DETAILED DESCRIPTION OF THE INVENTION

Figure 3:
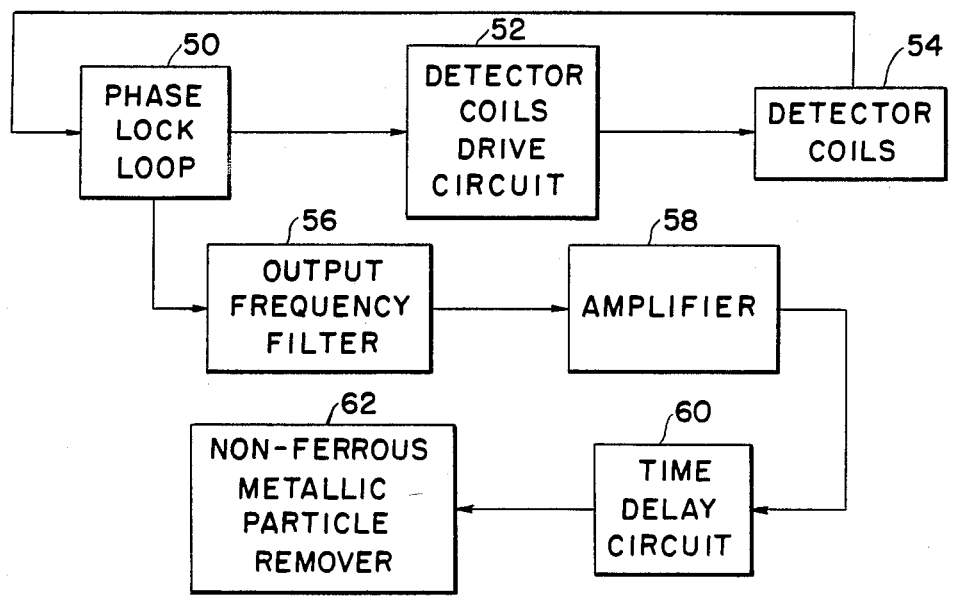
FIG. 3 is a block diagram showing a phase-lock loop detection circuit such as may be used according to the invention.

In the drawing, in FIG. 1 solid waste in the form of nonmetallic particles 10, ferrous metallic particles 13 and nonferrous metallic particles or agglomerates or masses 12 are conducted along a conveyor 14 and then down a slide 16 until they pass in the vicinity of detector coils 18 in association with an electronic activation system 20 which activates a particle remover 22, 62, preferably pneumatic, but which may be mechanical according to another embodiment of the invention. If pneumatic, the remover 22 may be made up of an air supply line which conducts air to an air valve and jet-type spray unit which causes most of the non-ferrous metallic particles 12 to fall into or onto a non-metallic residue conveyor 28, which is separated from the metallic concentrate conveyor 32 by a splitter 30.

In FIG. 2, solid waste 36 is first processed by a homogenizer 38 and then conducted into a magnetic separator 40 in which ferrous particles are magnetically separated from non-electrically conductive and non-ferrous particles. A mixture of non-metallic particles and non-ferrous metallic particles is then led through a non-ferrous metal concentrator 42. The metallic concentrate which has been separated out may then be passed through an eddy current aluminum separator 44 such as that of our U.S. Pat. No. 4,069,145 in which the particles are electromagnetically treated with the result that an aluminum product, often of at least 95% purity, is obtained, as shown at 46, at usually greater than 90% recovery when the aluminum content of the solid waste is a nominal 0.5 to 1.0% by weight.

Our preferred detection circuit as depicted in FIG. 3 is made up of a phase-lock loop (PLL) 50, detector coil drive 52, detector coil 54 and output frequency filter 56 and time delay circuit 60. The PLL circuit and coil circuit form a feedback loop which enables the coil to be driven at the natural electrical resonant frequency of the detector coil inductance and parallel tank circuit capacitance. This detection circuit is self-adjusting and immune to circuit electrical detuning caused by normal temperature induced component value variation.

As the value of the coil inductance changes due to proximity of an electrical conductor, the operating frequency of the PLL circuit changes to follow the natural tank frequency. During the frequency change interval the PLL circuit produces an error signal which is amplified at 58 and high pass filtered at 56 of FIG. 3. This signal is used to activate an air valve. Since the error signal is A. C. coupled to the air valve, slow changes in the tank and PLL frequency due to thermal drift of the circuit, component values may be rejected by the electrical filter. Additionally, since only rapid changes in frequency are allowed to activate the air valve, proximity of stationary electrical conductors (such as the air valve) does not significantly reduce the sensitivity of the detection system. The sensitivity of the detection circuit is sufficient to reliably detect aluminum cans 8 inches from the face of a slide 16 which supports a number of detector coils 18 as shown in FIG. 1.

Ferromagnetic materials such as steel and iron increase the inductance of the detection coils as they approach their position. Non-ferrous conductors such as aluminum, zinc and copper lower the inductance of the detection coils, thus raising the natural frequency of the coil/capacitor tank. This is due to eddy current effect. The PLL error signal changes polarity for increasing frequency as opposed to decreasing frequency. Thus, the detector system may be made to distinguish between ferrous and non-ferrous conductors of similar size. By proper filtering of the PLL error signal, the air valve may be actuated selectively to extract either ferrous or non-ferrous material. This allows the system of the invention to concentrate primarily non-ferrous conductors from a feed stream containing a majority of ferrous conductors.

A time delay circuit may be imposed between the detection circuit output and the air valve input when the detector coil and air nozzle are not located in the same position. In such case the detection coil is located upstream from the air valve, and its output is time-delayed to allow for the transit time of the detected object from the detection coil to the air nozzle.

According to a preferred embodiment of our invention an input feed stream of municipal waste which has been subjected to homogenization and magnetic separation and which originally contained 1% by volume of electrical conductors in the form of metal beverage containers and food cans mixed with poor or non-conductors such as paper, rocks, ceramics, linen and yard trimmings, moves horizontally via a conveyor 14. At the output end of the conveyor 14 mixed metals and non-conductors fall from the conveyor 14 onto a slide 16 angled at about 45 degrees from vertical. The slide supports a number of detector coils 18 arranged horizontally across the back of the slide. Each detector coil is in close proximity to an associated air nozzle. The feed material passes down the slide 16 until a segment of material containing a conductor passes within a preset range of a detector coil. At this time the detector coil triggers an air valve for approximately 20 milleseconds, producing a pulse of air which exits from the nozzle perpendicular to the slide face. The air blast is constrained to a defined region by use of the nozzle (for example, 6 inches wide). The air blast removes a portion of material approximately 6 inches in width and length dependent upon the air valve on time and velocity of the feed material passing by the air nozzle. The volume of material removed by the air pulse is maintained at an amount which insures that the percentage of conductor in the extracted material is higher than in the input feed stream. We have found that 125 psi air pressure applied through a commercially available air valve can produce separation velocities of 15 ft/sec constrained to within 25 degrees from a line perpendicular to the slide face. Air requirement is approximately 5 cubic feet of air per minute per ton per hour input feed at 0.5% aluminum content. A volume reduction of at least 90% is obtained when the detector is set to reject ferrous conductors.

While the invention has been described in terms of preferred embodiments, the claims appended hereto are intended to encompass all embodiments which fall within the spirit of the invention.

Having thus described our invention and certain preferred embodiments thereof, we claim:

1. A non-magnetic process for the separation of non-ferrous metallic particles from a solid waste mixture of non-metallic particles, ferrous metallic particles and non-ferrous metallic particles, comprising the steps of:
   (a) conducting a solid waste mixture of non-metallic particles, ferrous metallic particles, and non-ferrous metallic particles in a feed stream through a concentration zone,
   (b) electronically detecting said non-ferrous metallic particles in said concentration zone by passing all said particles in the vicinity of a detector coil connected in a phase detector circuit, said circuit producing a frequency phase error signal comparable to a decrease in the inductance of said detector coil responsive only to the proximity of said non-ferrous metallic particles,
   (c) removing said non-ferrous metallic particles from said ferrous metallic particles and said non-metallic particles in said feed stream in response to said frequency phase error signal.

2. The invention according to claim 1 further comprising the step of high-pass filtering said error signal so that said error signal is free of low frequencies generated by thermal drift of said phase detector circuit.

3. The process according to claim 1 in which said removing step comprises producing air pulses to project said non-ferrous metallic particles detected in said concentration zone in response to said error signal away from the other particles in said solid waste mixture in said feed stream.

4. The process according to claim 3 further comprising the step of delaying the producing of said air pulses after the production of said frequency phase error signal until the detected non-ferrous metallic particles are in the path of said air pulses.

5. The process according to claim 4 further comprising the step of high-pass filtering said error signal generated by said phase detector circuit.

6. The process according to claim 1 in which said phase detector circuit is a closed loop circuit including said detector coil and a phase lock loop.

7. The process according to claim 1 in which said removing step comprises projecting said non-ferrous metallic particles detected in said concentration zone in response to said error signal away from said feed stream of said solid waste mixture.

* * * * *